(12) United States Patent
Whitaker (10) Patent No.: US 9,697,157 B2
(45) Date of Patent: Jul. 4, 2017

(54) MULTI-CONNECTIVITY BOOST EXTENDER AND CONNECTIVITY DEVICE

(71) Applicant: Vanco International, LLC., Batavia, IL (US)

(72) Inventor: Joseph Allen Whitaker, O Fallon, MO (US)

(73) Assignee: Vanco International, LLC, Batavia, IL (US)

( * ) Notice: Subject to any disclaimer, the term of this patent is extended or adjusted under 35 U.S.C. 154(b) by 185 days.

(21) Appl. No.: 14/463,849

(22) Filed: Aug. 20, 2014

(65) Prior Publication Data

US 2015/0067203 A1 Mar. 5, 2015

Related U.S. Application Data

(60) Provisional application No. 61/870,956, filed on Aug. 28, 2013, provisional application No. 61/881,563, filed on Sep. 24, 2013.

(51) Int. Cl.
| | | |
|---|---|---|
| *G06F 3/00* | (2006.01) | |
| *G06F 13/12* | (2006.01) | |
| *G06F 13/38* | (2006.01) | |
| *G06F 13/00* | (2006.01) | |
| *G06F 13/40* | (2006.01) | |

(52) U.S. Cl.
CPC ........ *G06F 13/385* (2013.01); *G06F 13/4027* (2013.01)

(58) Field of Classification Search
CPC ...... G06F 1/1605; G06F 3/125; G06F 3/1251; G06F 17/30017; G06F 13/385; G06F 13/4027

USPC .............................. 710/63, 16, 100, 300, 304
See application file for complete search history.

(56) References Cited

U.S. PATENT DOCUMENTS

| | | | |
|---|---|---|---|
| 2006/0010274 A1* | 1/2006 | Olson | H04L 25/45 710/300 |
| 2006/0036788 A1* | 2/2006 | Galang | G09G 5/006 710/65 |
| 2009/0013372 A1* | 1/2009 | Oakes | H04N 21/4143 725/139 |
| 2009/0049498 A1* | 2/2009 | Li | G09G 5/006 725/127 |

(Continued)

*Primary Examiner* — Idriss N Alrobaye
*Assistant Examiner* — Getente A Yimer
(74) *Attorney, Agent, or Firm* — Thomas | Horstemeyer, LLP (57) ABSTRACT

Aspects of transmit and receive connectivity devices are described. In one embodiment, a transmit connectivity device includes a first high definition multimedia interface (HDMI) port, signal processing circuitry configured to receive a media signal and to convert the media signal to a converged media signal, a multi-position multi-contact port, and a second HDMI port. The multi-position multi-contact port may include a first plurality of contacts coupled to the signal processing circuitry to transmit the converged media signal to at least one sink device, and a subset of a second plurality of contacts of the HDMI port may be coupled to the first plurality of contacts. Using the connectivity devices described herein, HDMI cables may be relied upon to communicate combinations of media signals, including full uncompressed high definition video, audio, 100BaseT Ethernet, and various control signals.

20 Claims, 4 Drawing Sheets

(56) References Cited

U.S. PATENT DOCUMENTS

2010/0259691 A1* 10/2010 Sasazaki ............... G09G 5/006
 348/723
2012/0039051 A1* 2/2012 Chang .................. H04W 88/02
 361/752

* cited by examiner

MULTI-CONNECTIVITY BOOST EXTENDER AND CONNECTIVITY DEVICE

CROSS-REFERENCE TO RELATED APPLICATIONS

This application claims the benefit of U.S. Provisional Application No. 61/870,956, filed Aug. 28, 2013, and U.S. Provisional Application No. 61/881,563, filed Sep. 24, 2013, the entire contents of both of which applications are hereby incorporated herein by reference.

BACKGROUND

The high definition multimedia interface (HDMI) is a common audiovisual standard for the transmission of high definition video, audio, and related media signals. In this context, HDMI defines an interface for transferring uncompressed video and compressed or uncompressed audio data from a source device to a sink device. HDMI has generally been relied upon as a digital replacement for conventional analog video standards.

HDMI is compatible with the HDCP (High-bandwidth Digital Content Protection) digital rights management technology, and provides an interface between any compatible digital source device, such as a set-top box, a Blu-ray® digital-versatile disc (DVD) player, an HD DVD player, a personal computer, or a video game console, for example, and a compatible sink device, such as a digital television, computer monitor, display, etc.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As noted above, the high definition multimedia interface (HDMI) is a common audiovisual standard for the transmission of high definition video, audio, and related media signals. In this context, HDMI defines an interface for transferring uncompressed video and compressed or uncompressed audio data from a source device to a sink device. HDMI has generally been relied upon as a digital replacement for conventional analog video standards.

At least in part, HDMI interfaces rely upon the EIA/CEA-861 (ANSI) standards. These standards define video signal formats, compressed, uncompressed, and linear pulse code modulation (LPCM) audio formats, and the format for any auxiliary data, among other data and/or signaling protocols. HDMI interfaces rely upon TMDS (Transition Minimized Differential Signaling) to send media signals from a source device to a sink device. Also, when used, the consumer electronics control (CEC) capability allows HDMI-compatible devices to control or signal each. In this case, a user may be able to operate multiple devices with one remote control.

One possible drawback of HDMI as a connection standard, at least when it comes to high definition video distribution, is the limitation of HDMI cable length. Installation costs may escalate when considering HDMI cables and, when necessary, HDMI repeaters. To cope with this limitation, various HDMI extender protocols have been developed which operate over standard category 5e or 6 cables, for example. These protocols, in part, may provide a solution to support HDMI extension along with different control signals including CEC, infrared (IR), RS232, and universal serial bus (USB).

HDBaseT is a connectivity technology optimized for media signal distribution promoted by the HDBaseT Alliance. In some forms, the HDBaseT technology includes a "5Play" feature which achieves the transmission of full uncompressed high definition video, audio, 100BaseT Ethernet, power, and various control signals through a single standard 100 m/328 ft category 5e, 6, 6a or 7 cable. HDBaseT also supports the HDCP digital rights management technology.

HDBaseT supports television and computer video formats including standard, enhanced, high-definition (HD) and three-dimensional (3D) video, and also supports many audio standards. As noted, HDBaseT supports 100 Mb Ethernet, enabling televisions, hi-fi equipment, computers and other devices to communicate with each other and to access stored multimedia content. Different types of control signals are also supported by HDBaseT technology.

HDBaseT technology may be incorporated into HDMI signal extenders. HDMI signal extenders generally operate as local transmit and remote receive unit pairs, coupled by category 5e, 6, 6a, or 7 cable. As one example, an HDMI extender pair including HDBaseT technology may support full HD/3D video extension over a 328 ft category 5e, 6, 6a, or 7 cable, with support for HDCP, CEC, and IR. Another example embodiment of an HDMI extender pair may support these features plus 100BaseT Ethernet, RS232, and universal serial bus (USB) for a USB keyboard, a USB mouse, or other USB devices. In some cases, these HDMI extenders may be designed to require only one power supply for both the local and remote units. In this case, the power supply may be connected to either one of the local or remote units, and power may be supplied to the other unit over the interconnecting cable between them.

According to aspects of the embodiments described herein, transmit and receive extender or connectivity devices are described. The transmit and receive extenders are configured to extend media signals from various sources, such as a set-top box, a Blu-ray digital-versatile disc (DVD) player, an HD DVD player, a personal computer (PC), or a video game console, for example, to various sink devices, such as a digital television, computer monitor, or display, among other sink devices.

The extenders may include signal processing circuitry configured to receive one or more media signals from at least one source device and to convert the media signals to a converged media signal based on a converged signal specification. In some embodiments, the converged signal specification may comprise the HDBaseT specification. The transmit extender may then transmit the converged signal to the receiver extender over one or more different kinds of cables, including a twisted pair cable, such as a category 5e, 6, 6a, or 7 cable, and an HDMI cable. In one embodiment, the transmit and receive extenders may include various ports for connecting both twisted pair and HDMI cables. Thus, to transmit the converted signal between the transmit and receive extenders, either a twisted pair cable or an HDMI cable may be relied upon for transmission of the converged signal.

In the context of transmit and receive extenders using HDBaseT technology, it should be appreciated that, once various media signals are converged into a converged media signal using HDBaseT or another similar technology, the transmit and receive extenders typically offer the ability to communicate the converged signal using standard twisted pair cables. According to aspects of the embodiments described herein, however, the transmit and receive extenders may also communicate the converged signal using an HDMI cable, regardless of the category of the HDMI cable (e.g., regardless of whether the HDMI cable is a category 1 or 2 cable). Thus, using the transmit and receive extenders described herein, HDMI cables may be relied upon to communicate combinations of various media signals, including full uncompressed high definition video, audio, 100BaseT Ethernet, and various control signals such as CEC, infrared (IR), RS232, and universal serial bus (USB) signals. In other words, according to aspects of the embodiments described herein, HDMI cables may be "retrofitted" into richer 2-way HDBaseT cables delivering 4K HD/3D and video, bi-directional IR, RS232 control signals, and even 100BaseT Ethernet.

Turning now to the drawings, the aspects and features of various embodiments will be described in further detail.

Figure 1:
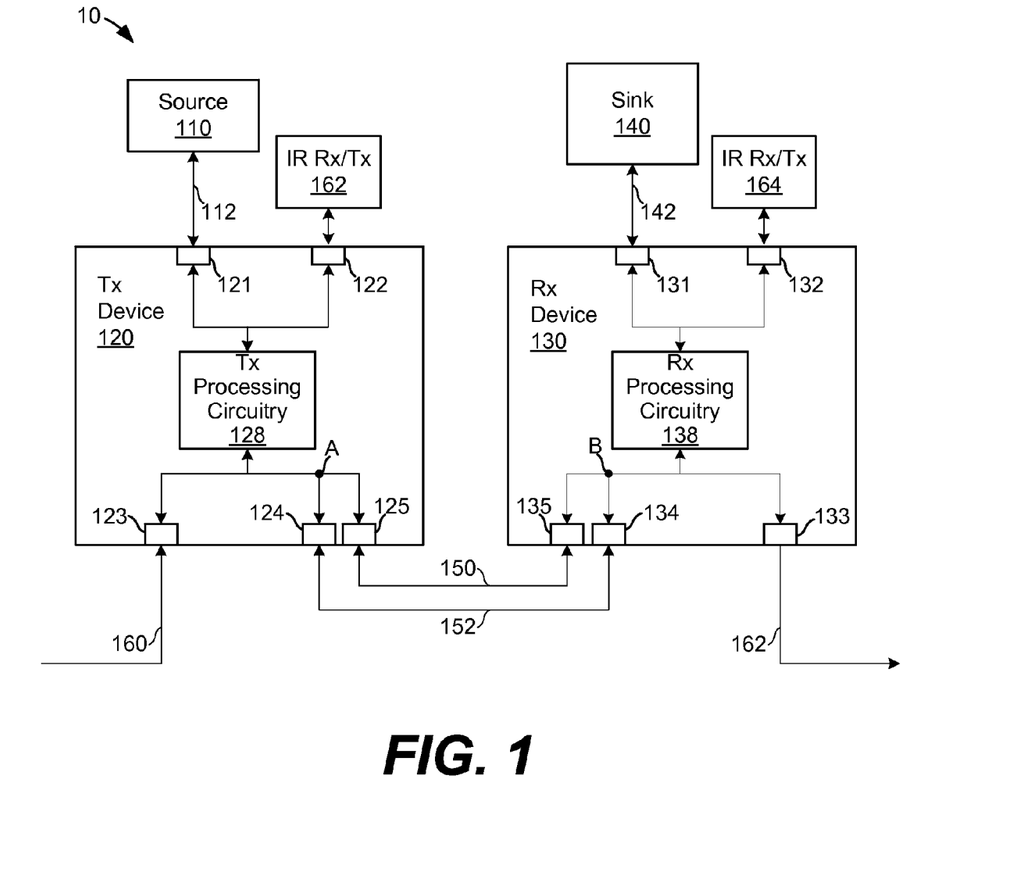
FIG. 1 illustrates a connectivity system according to an example embodiment of the present disclosure.

FIG. 1 illustrates an extender system 10 including a media signal source device 110, a transmitter extender device 120, a receiver extender device 130, a sink device 140, a first IR receive/transmit module 162, and a second IR receive/transmit module 164. In the embodiment illustrated in FIG. 1, the media signal source device 110 is electrically coupled to the transmitter extender device 120 at an HDMI port 121 by way of an HDMI cable 112. Beside the HDMI port 121, the transmitter extender device 120 further includes an IR receive/transmit port 122, at least one Ethernet port 123, a second HDMI port 124, and a multi-position multi-contact port 125. In one embodiment, the multi-position multi-contact port 125 comprises an RJ45 port having eight contacts, and each of the HDMI ports 121 and 124 comprises an HDMI port having nineteen contacts. In other embodiments, the multi-position, multi-contact port 125 and each of the HDMI ports 121 and 124 may comprise greater or fewer contacts.

The media signal source device 110 is representative of one or more source devices, such as set-top boxes, Blu-ray® digital-versatile disc (DVD) players, HD DVD players, personal computers, or video game consoles, for example. The sink device 140 is representative of one or more sink devices, such as a digital television, computer monitor, display, etc., without limitation.

The first and second IR receive/transmit modules 162 and 164 are generally configured to receive, transmit, and relay (e.g., pass-through) IR control signals to and from IR remote controls and other devices which include IR receivers and transmitters for control. In other words, in addition to extending media signals from the source device 110 to the sink device 140, the extender system 10 is also able to extend IR control signals between the transmitter extender device 120 and the receiver extender device 130. Further, through the Ethernet port 123, the transmitter extender device 120 may receive packet data from a computing device (not shown) by way of the twisted pair cable 160. In this context, the extender system 10 may also extend the packet data between the transmitter extender device 120 and the receiver extender device 130.

The transmitter extender device 120 also includes transmit processing circuitry 128. At the outset, it should be appreciated that the transmit processing circuitry 128 may be comprised of a combination of different types of circuitry, including various types of integrated processing circuits, driver circuits, memory, etc. Generally, any combination of circuitry or logic suitable to achieve the media signal conversion and boost extension features described herein may be relied upon. With particular regard to HDBaseT technology and media signal conversion according to the HDBaseT specification, one exemplary HDBaseT transmit processor is the Valens VS100TX HDBaseT Transmitter, manufactured by Valens Semiconductor Ltd. of Hod Hasharon, Israel. It should be appreciated, however, that any suitable type of HDBaseT or similar technology transmit processor may be relied upon.

The transmit processing circuitry 128 is configured to receive media signals, such as one or more media signals from the media signal source device 110, IR control signals from the first IR receive/transmit module 162, and/or packet data from the computing device (not shown), for example, and to convert the media signals to a converged media signal based on a converged signal specification. In one embodiment, the converged signal specification comprises the HDBaseT specification, although other specifications are within the scope of the embodiments. In this context, it should be appreciated that the converged media signal may take on signal level, timing, and/or protocol characteristics different from those of the original signals from the source device 110, the first IR receive/transmit module 162, and/or the computing device, individually. In one embodiment, the converged signal may be output by the transmit processing circuitry 128 at the physical layer as a plurality of differential signal pairs. The converged signal output from the transmit processing circuitry 128 is output to both the second HDMI port 124 and the multi-position multi-contact port 125, as further discussed below.

As noted above, in one embodiment, HDBaseT technology is incorporated into the transmit signal processing circuitry 128. Thus, the transmitter extender device 120 may be configured to support the extended transmission of full uncompressed high definition video, audio, and 100BaseT Ethernet data packets, along with various control signals such as CEC, IR, RS232, and USB signals.

The transmitter extender device 120 is coupled to the receiver extender device 130 by at least one of the cables 150 and 152. The cable 150 may be embodied as a signal cable including a plurality of twisted pairs of conductors, such as a category 5e, 6, 6a, or 7 cable, for example, among other similar, suitable cables (i.e., "a twisted pair cable"). Depending upon the category of the twisted pair cable 150, the twisted pair cable 150 may range up to about 328 ft in length.

The cable 152 may be embodied as an HDMI cable compliant with at least one of the HDMI specifications (e.g., 1.1-1.4 or after) or HDMI compliance testing specifications (e.g., 1.1-1.4 or after) (i.e., "an HMDI cable"). Further, the HDMI cable 152 may be embodied as either a standard or category 1 cable or a high speed category 2 cable and may include the Ethernet and audio return channel. Depending upon the category or quality of the HDMI cable 152, the HDMI cable 152 may range up to about 150 ft in length. The HDMI cable 152 may be embodied as an active cable including an in-line amplifier, equalizer, and/or filter, but such in-line circuitry is not relied upon in the preferred embodiments.

The sink device 140 is electrically coupled to the receiver extender device 130 at an HDMI port 131 by way of an HDMI cable 142. Beside the HDMI port 131, the receiver extender device 130 further includes an IR receive/transmit port 132, at least one Ethernet port 133, a second HDMI port 134, and a multi-position multi-contact port 135.

The receiver extender device 130 also includes receive processing circuitry 138. It should be appreciated that the receiver processing circuitry 138 may be comprised of a combination of different types of circuitry, including various types of integrated processing circuits, driver circuits, memory, etc. Generally, any combination of circuitry or logic suitable to achieve the media signal conversion and boost extension features described herein may be relied upon. With particular regard to HDBaseT technology and media signal conversion according to the HDBaseT specification, one exemplary HDBaseT receive processor is the Valens VS100RX HDBaseT Receiver, manufactured by Valens Semiconductor Ltd. of Hod Hasharon, Israel. It should be appreciated, however, that any suitable type of HDBaseT or similar technology receive processor may be relied upon.

The receive processing circuitry 138 is configured to receive a converged media signal over at least one of the multi-position multi-contact port 135 or the second HDMI port 134 and to convert the converged media signal to one or more media signals for output by the sink device 140 based on a converged signal specification. In one embodiment, the converged signal specification comprises the HDBaseT specification, although other specifications are within the scope of the embodiments. In this context, it should be appreciated that the converged media signal may have signal level, timing, and/or protocol characteristics different from those of the media signals for output.

As illustrated in FIG. 1, the HDMI cable 152 is coupled to both the second HDMI port 124 of the transmitter extender device 120 and the second HDMI port 134 of the receiver extender device 130. Similarly, the twisted pair cable 150 is coupled to both the multi-position multi-contact port 125 of the transmitter extender device 120 and the multi-position multi-contact port 135 of the receiver extender device 130. Thus, in the embodiment illustrated in FIG. 1, the converged media signal may be transmitted over either the twisted pair cable 150 or the HDMI cable 152. Here, again, it should be appreciated that transmit and receive extenders typically offer the ability to communicate a converged signal using standard twisted pair cables similar to the twisted pair cable 150. According to aspects of the embodiments described herein, however, the transmit and receive extenders 120 and 130 may also communicate the converged signal using the HDMI cable 150, regardless of whether the HDMI cable 150 is a category 1 or 2 cable. Thus, using the transmit and receive extenders 120 and 130 described herein, HDMI cables such as the HDMI cable 150 may be relied upon to communicate combinations of various media signals, including full uncompressed high definition video, audio, 100BaseT Ethernet data packets, and various control signals such as CEC, IR, RS232, and USB signals.

Figure 2:
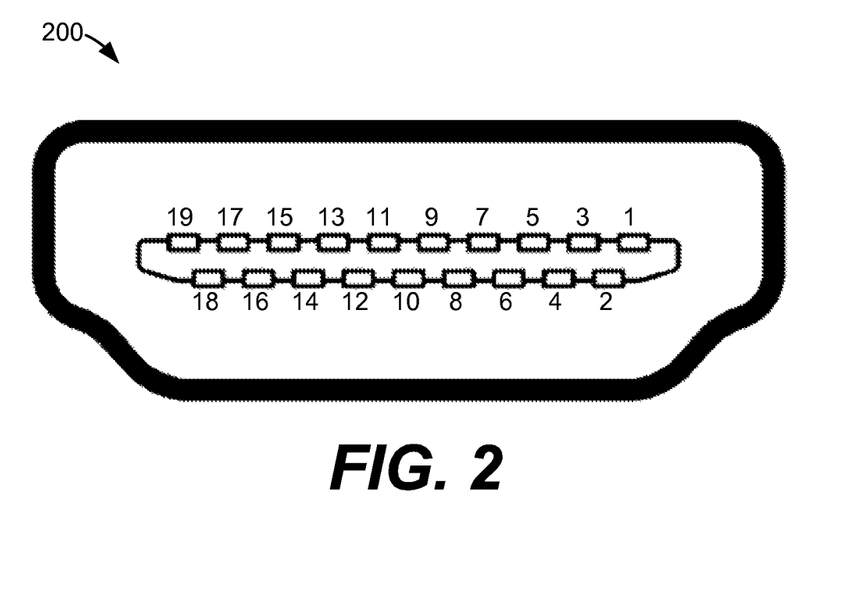
FIG. 2 illustrates an example pinout of a high definition multimedia interface (HDMI) port.

Turning to FIG. 2, an example pinout of an HDMI port 200 is illustrated. The HDMI port 200 may be relied upon in one or both of the transmitter extender device 120 and the receiver extender device 130 at any or all of the HDMI ports 121, 124, 131, or 134. Generally, in the transmitter 120 and receiver extender devices 120 and 130, the HDMI port 200 may be relied upon for connections to HDMI cables such as the HDMI cables 112, 152, and 142. As illustrated in FIG. 2, the HDMI port 200 includes nineteen contacts or port pins. In other embodiments, the HDMI port 200 may include greater or fewer contacts. Table 1, below, provides a listing of the nineteen contacts or port pins in the HDMI port 200 and their corresponding HDMI signal names or pin identities. In Table 1, it can be appreciated that HDMI port 200 includes a plurality of contacts. A subset of the contacts including four pair of differential contacts, TMDS Data 0, 1, 2, and Clock.

TABLE 1

HDMI Jack Pinout

| HDMI Port Pin | HDMI Signal Identity |
|---|---|
| 1 | TMDS Data 2+ |
| 2 | TMDS Data 2 Shield− |
| 3 | TMDS Data 2− |
| 4 | TMDS Data 1+ |
| 5 | TMDS Data 1 Shield |
| 6 | TMDS Data 1− |
| 7 | TMDS Data 0+ |
| 8 | TMDS Data 0 Shield |
| 9 | TMDS Data 0− |
| 10 | TMDS Clock + |
| 11 | TMDS Clock Shield |
| 12 | TMDS Clock− |
| 13 | CEC |
| 14 | Reserved |
| 15 | SCL |
| 16 | SDA |
| 17 | DDC/CEC Ground |
| 18 | +5V Power |
| 19 | Hot Plug Detect |

Figure 3:
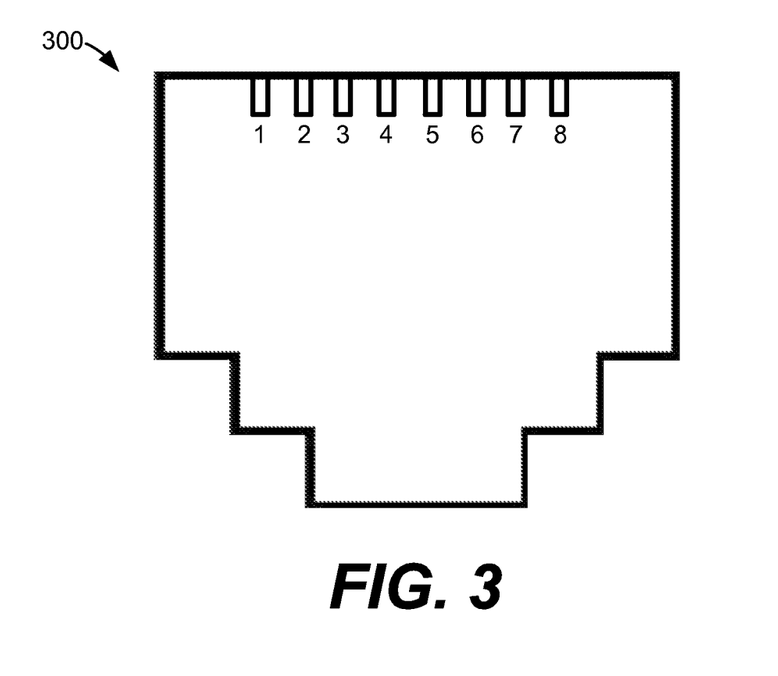
FIG. 3 illustrates an example pinout of a multi-position multi-contact port.

FIG. 3 illustrates an example pinout of a multi-position multi-contact port 300. The multi-position multi-contact port 300 may be relied upon in one or both of the transmitter extender device 120 and the receiver extender device 130 at any or all of the ports 123, 125, 133, or 135. Generally, in the transmitter 120 and receiver extender devices 120 and 130, the multi-position multi-contact port 300 may be relied upon for connections to twisted pair cables such as the twisted pair cables 160, 162, and 150. As illustrated in FIG. 3, the multi-position multi-contact port 300 includes eight contacts or port pins. In other embodiments, the multi-position multi-contact port 300 may include greater or fewer contacts. Tables 2 and 3 below provide listings of the eight contacts or port pins in the multi-position multi-contact port 300 and their corresponding signal names or pin identities, for both the T568A and T568B TIA/EIA-568 telecommunications standards. In Tables 2 and 3, it can be appreciated that multi-position multi-contact port 300 includes a plurality of contacts and, particularly, four pairs of differential contacts, Diff Pair 0, 1, 2, and 3.

TABLE 2

T568A Port Pinout

| T568A Port Pin | Conductor Identity | Signal Identity |
|---|---|---|
| 1 | Green/White | Diff Pair 0+ |
| 2 | Green | Diff Pair 0− |
| 3 | Orange/White | Diff Pair 1+ |

TABLE 2-continued

T568A Port Pinout

| T568A Port Pin | Conductor Identity | Signal Identity |
|---|---|---|
| 4 | Blue | Diff Pair 2+ |
| 5 | Blue/White | Diff Pair 2− |
| 6 | Orange | Diff Pair 1− |
| 7 | Brown/White | Diff Pair 3+ |
| 8 | Brown | Diff Pair 3− |

As described above in connection with FIG. 1, the HDMI cable 152 is coupled to both the second HDMI port 124 of the transmitter extender device 120 and the second HDMI port 134 of the receiver extender device 130. Similarly, the twisted pair cable 150 is coupled to both the multi-position multi-contact port 125 of the transmitter extender device 120 and the multi-position multi-contact port 135 of the receiver extender device 130. Thus, in the embodiment illustrated in FIG. 1, the converged media signal may be transmitted over either the twisted pair cable 150 or the HDMI cable 152. To facilitate the ability for converged media signal to be transmitted over either the twisted pair cable 150 or the HDMI cable 152, certain port pins of the HDMI port 124 and the multi-position multi-contact port 125 are electrically coupled together in the transmitter extender device 120. The node "A" in FIG. 1 is representative of this electrical coupling between the port pins of the HDMI port 124 and the multi-position multi-contact port 125. Similarly, certain port pins of the HDMI port 134 and the multi-position multi-contact port 135 are electrically coupled together in the receiver extender device 130. The node "B" in FIG. 1 is representative of this electrical coupling between the port pins of the HDMI port 134 and the multi-position multi-contact port 135.

In Table 3 below, one example of the electrical couplings between the port pins of the HDMI port 124 and the multi-position multi-contact port 125 at node "A" is provided. In this sense, Table 3 similarly provides an example of the electrical couplings between the HDMI port 134 and the multi-position multi-contact port 135 at node "B".

TABLE 3

Example Electrical Couplings Between HDMI port 134 and Multi-Position Multi-Contact Port 135

| T568A Port Pin | Conductor Identity | Signal Identity | HDMI Port Pin Coupling | HDMI Signal Identity |
|---|---|---|---|---|
| 1 | Green/White | Diff Pair 0+ | 4 | TMDS Data 1+ |
| 2 | Green | Diff Pair 0− | 6 | TMDS Data 1− |
| 3 | Orange/White | Diff Pair 1+ | 1 | TMDS Data 2+ |
| 4 | Blue | Diff Pair 2+ | 9 | TMDS Data 0− |
| 5 | Blue/White | Diff Pair 2− | 7 | TMDS Data 0+ |
| 6 | Orange | Diff Pair 1− | 3 | TMDS Data 2− |
| 7 | Brown/White | Diff Pair 3+ | 10 | TMDS Clock+ |
| 8 | Brown | Diff Pair 3− | 12 | TMDS Clock− |

In Table 3, it can be seen that, in one embodiment, a first plurality of differential pair contacts from the multi-position multi-contact port 125 (i.e., Diff Pairs 0, 1, 2, and 3) are electrically coupled to a second plurality of differential pair contacts from the HDMI port 124 (i.e., TMDS Data 0, 1, 2, and Clock). Here, it should be appreciated that, because the converged signal specification (e.g., the HDBaseT specification) defines or relies upon a plurality of differential signal pairs at the physical layer, the coupling of the multi-position multi-contact port 125 contacts to the HDMI port 124 according to the example defined in Table 3 permits the transmit and receive extenders 120 and 130 to communicate various media signals as a converged media signal across either the twisted pair cable 150 or the HDMI cable 152. In this case, it is also noted that although the HDMI cable 152 includes nineteen conductors, only eight of those conductors may be relied upon to communicate the converged media signal from the transmit extender device 120 and to the receive extender device 130.

In Table 4 below, other alternative examples of the electrical couplings between the port pins of the HDMI port 124 and the multi-position multi-contact port 125 at node "A" is provided. In this sense, Table 4 similarly provides other alternative examples of the electrical couplings between the HDMI port 134 and the multi-position multi-contact port 135 at node "B."

TABLE 4

Alternative Electrical Couplings Between HDMI port 134 and Multi-Position Multi-Contact Port 135

| T568A Port Pin | Conductor Identity | Signal Identity | HDMI Port Pin Coupling | HDMI Signal Identity |
|---|---|---|---|---|
| 1 | Green/White | Diff Pair 0+ | 7, 4, 1, or 10 | TMDS Data 0, 1, 2, or Clock+ |
| 2 | Green | Diff Pair 0− | 9, 6, 3, or 12 | TMDS Data 0, 1, 2, or Clock− |
| 3 | Orange/White | Diff Pair 1+ | 7, 4, 1, or 10 | TMDS Data 0, 1, 2, or Clock+ |
| 4 | Blue | Diff Pair 2+ | 9, 6, 3, or 12 | TMDS Data 0, 1, 2, or Clock− |
| 5 | Blue/White | Diff Pair 2− | 7, 4, 1, or 10 | TMDS Data 0, 1, 2, or Clock+ |
| 6 | Orange | Diff Pair 1− | 9, 6, 3, or 12 | TMDS Data 0, 1, 2, or Clock− |
| 7 | Brown/White | Diff Pair 3+ | 7, 4, 1, or 10 | TMDS Data 0, 1, 2, or Clock+ |
| 8 | Brown | Diff Pair 3− | 9, 6, 3, or 12 | TMDS Data 0, 1, 2, or Clock− |

In Table 4, it can be seen that, among other embodiments, any pair of differential pair contacts from the multi-position multi-contact port 125 (i.e., Diff Pairs 0, 1, 2, and 3) may be electrically coupled to any other pair of differential pair contacts from the HDMI port 124 (i.e., TMDS Data 0, 1, 2, and Clock). Generally, the embodiments described herein include electrical couplings which maintain each pair of physical layer differential signals coupled to differential pair of contacts on a twisted pair or HDMI cable.

Figure 4:
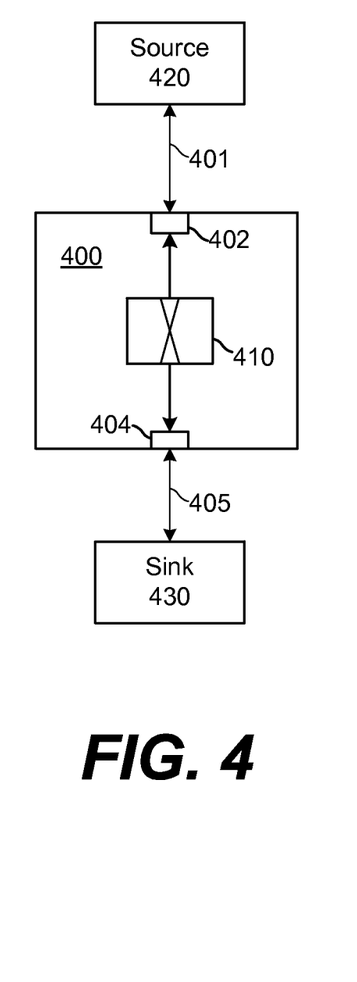
FIG. 4 illustrates a connectivity device according to an example embodiment of the present disclosure.

FIG. 4 illustrates a connectivity device 400 according to another example embodiment of the present disclosure. The connectivity device 400 couples a source device 420 to a sink device 430. The connectivity device 400 includes a first port 402 and a second port 404. The first and second ports 402 and 404 comprise multi-position multi-contact and HDMI ports, respectively. In one embodiment, the first and second ports 402 and 404 comprise eight conductors and nineteen conductors, respectively, similar to the multi-position multi-contact and HDMI ports 200 and 300 of FIGS. 2 and 3. The source device 420 is coupled to the first port 402 of the connectivity device 400 by way of a twisted pair cable 401, and the sink device 430 is coupled to the second port 404 of the connectivity device 400 by way of an HDMI cable 401.

The connectivity device 400 further includes an electrical connection 410. The electrical connection 410 electrically couples a subset of the contacts from the HDMI port 404 to respective ones of the contacts from the multi-position multi-contact port 402. The electrical couplings provided by the electrical connection 410 may be defined according to Tables 3 or 4 above, for example. Generally, the electrical connection 410 of the connectivity device 400 includes electrical couplings that connect each differential pair of conductors in the twisted pair cable 401 to a corresponding differential pair of contacts for the HDMI cable 405. In this manner, signals transmitted over the twisted pair cable 401 may be further propagated over the HDMI cable 405 and vice versa.

It is noted that the connectivity device 400 may comprise a passive device, particularly relying upon passive electrical connections in 410 to couple signals from one type or style of connector or port to another. Alternatively, the connectivity device 400 may comprise an active driver as part of the electrical connections in 410. In this case, the connectivity device 400 may include driver, filter, and/or equalizer circuitry to boost, relay, or repeat signals received over the cables 401 and/or 405. This type of active driver circuitry may be particularly useful if the connectivity device 400 will be relied upon to connect two or more lengths of twisted pair and HDMI cables.

In various embodiments, the first port 402 of the connectivity device 400 may include either a male or female RJ45 jack or connector. Similarly, the second port 405 of the connectivity device 400 may include either a male or female HDMI jack or connector. Thus, the port 402 at one end of the connectivity device 400 may be inserted directly into an RJ45 jack of the source device 420, for example, and an HDMI cable may be connected to the port 405 of the connectivity device 400 at another end. In this way, various types of HDMI cables may be "retrofitted" into richer 2-way HDBaseT cables delivering 4K HD/3D and video, bi-directional IR, RS232 control signals, and even 100BaseT Ethernet.

Figure 5:
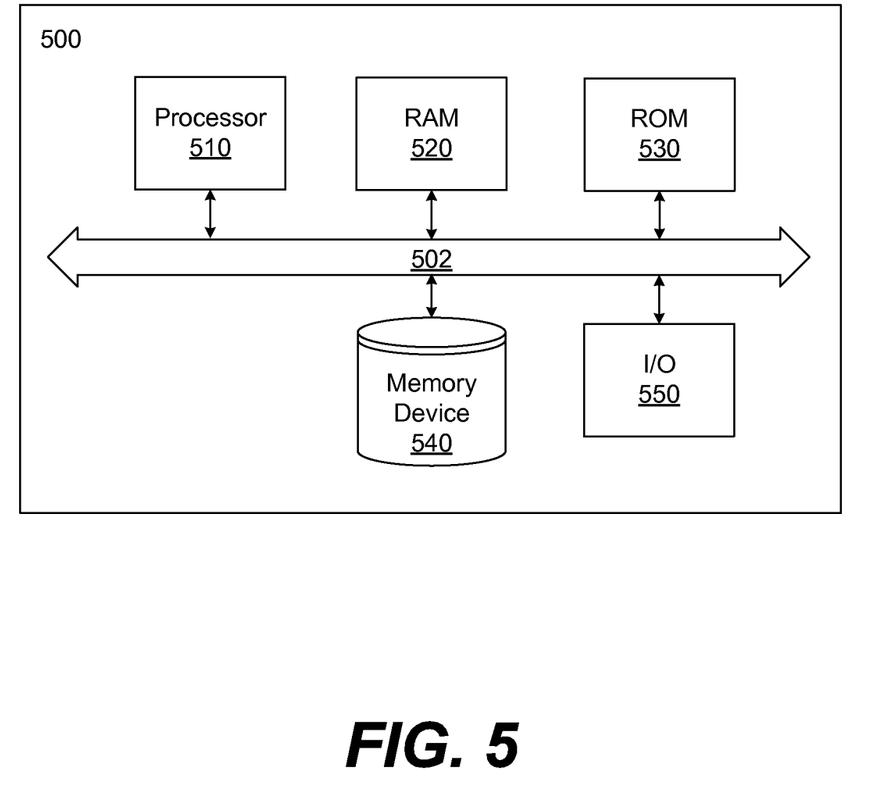
FIG. 5 illustrates an example schematic block diagram of a computing environment which may embody one or more of the system elements of FIG. 1A according to various embodiments.

FIG. 5 illustrates an example schematic block diagram of a computing architecture 500 that may be employed as either of the transmit processing circuitry 128 or the receive processing circuitry 138, according to various embodiments described herein. The computing architecture 500 may be embodied, in part, using one or more elements of a specific purpose processing circuit or computing device. The computing architecture 500 includes a processor 510, a random access memory (RAM) 520, a Read Only Memory (ROM) 520, a memory device 540, and an Input Output (I/O) interface 550. The elements of computing architecture 500 are communicatively coupled via one or more local interfaces 502. The elements of the computing architecture 500 are not intended to be limiting in nature, as the architecture may omit elements or include additional or alternative elements.

In various embodiments, the processor 510 may include or be embodied as a general purpose arithmetic processor, a state machine, or an ASIC, for example. The processor 510 may include one or more circuits, one or more microprocessors, ASICs, dedicated hardware, or any combination thereof. In certain aspects and embodiments, the processor 510 is configured to execute one or more software modules which may be stored, for example, on the memory device 540.

The RAM and ROM 520 and 530 may include or be embodied as any random access and read only memory devices that store computer-readable instructions to be executed by the processor 510. The memory device 540 stores computer-readable instructions thereon that, when executed by the processor 510, direct the processor 510 to execute various aspects of the embodiments described herein.

As a non-limiting example group, the memory device 540 includes one or more non-transitory memory devices, such as an optical disc, a magnetic disc, a semiconductor memory (i.e., a semiconductor, floating gate, or similar flash based memory), a magnetic tape memory, a removable memory, combinations thereof, or any other known non-transitory memory device or means for storing computer-readable instructions. The I/O interface 550 includes device input and output interfaces, such as keyboard, pointing device, display, communication, and/or other interfaces. The one or more local interfaces 502 electrically and communicatively couples the processor 510, the RAM 520, the ROM 530, the memory device 540, and the I/O interface 550 so that data and instructions may be communicated among them.

In certain aspects, the processor 510 is configured to retrieve computer-readable instructions and data stored on the memory device 540, the RAM 520, the ROM 530, and/or other storage means and copy the computer-readable instructions to the RAM 520 or the ROM 530 for execution, for example. The processor 510 is further configured to execute the computer-readable instructions to implement various aspects and features of the embodiments described herein. In embodiments where the processor 510 includes a state machine or ASIC, the processor 510 may include internal memory and registers for maintenance of data being processed.

Disjunctive language, such as the phrase "at least one of X, Y, or Z," unless specifically stated otherwise, is to be understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A transmit connectivity device, comprising:
   a first high definition multimedia interface (HDMI) port;
   signal processing circuitry configured to receive a media signal from at least one source device coupled to the first HDMI port and to convert the media signal to a converged media signal based on a converged signal specification;
   a multi-position multi-contact port having a first plurality of contacts coupled to the signal processing circuitry to transmit the converged media signal to at least one sink device, the multi-position multi-contact port comprising an RJ45 port;
   a second HDMI port having a second plurality of contacts, individual ones of a subset of the second plurality of contacts of the second HDMI port being directly electrically coupled to individual ones of the first plurality of contacts of the multi-position multi-contact port;

a fourth contact of nineteen contacts of the HDMI port being coupled to a first contact of eight contacts of the RJ45 port;

a sixth contact of the nineteen contacts of the HDMI port being coupled to a second contact of the eight contacts of the RJ45 port;

a first contact of the nineteen contacts of the HDMI port being coupled to a third contact of the eight contacts of the RJ45 port;

a ninth contact of the nineteen contacts of the HDMI port being coupled to a forth contact of the eight contacts of the RJ45 port;

a seventh contact of the nineteen contacts of the HDMI port being coupled to a fifth contact of the eight contacts of the RJ45 port;

a third contact of the nineteen contacts of the HDMI port being coupled to a sixth contact of the eight contacts of the RJ45 port;

a tenth contact of the nineteen contacts of the HDMI port being coupled to a seventh contact of the eight contacts of the RJ45 port; and a twelfth contact of the nineteen contacts of the HDMI port being coupled to an eighth contact of the eight contacts of the RJ45 port.

2. The transmit connectivity device according to claim 1, wherein:

the first plurality of contacts comprises a first plurality of differential pair contacts;

the subset of the second plurality of contacts comprises a second plurality of differential pair contacts; and the converged signal specification defines a plurality of differential signal pairs at a physical layer, the plurality of differential signal pairs being coupled to the first plurality of contacts and the subset of the second plurality of contacts.

3. The transmit connectivity device according to claim 2, wherein each differential pair of contacts from the first plurality of differential pair contacts is coupled to a respective differential pair of contacts from the second plurality of differential pair contacts.

4. The transmit connectivity device according to claim 1, wherein:

the RJ45 port comprises a T568 telecommunications standard pinout of the eight contacts; and the second HDMI port comprises an HDMI standard pinout of the nineteen contacts.

5. The transmit connectivity device according to claim 1, wherein the converged signal specification comprises the HDBaseT specification.

6. The transmit connectivity device according to claim 1, wherein the media signal comprises at least one of uncompressed high definition video, digital audio, control, or data signals.

7. The transmit connectivity device according to claim 1, wherein the signal processing circuitry is configured to receive uncompressed high definition video, digital audio, control, and data signals from the at least one source device and to convert the uncompressed high definition video, digital audio, control, and data signals to the converged media signal based on the converged signal specification.

8. A receive connectivity device, comprising:

a multi-position multi-contact port having a first plurality of contacts, the multi-position multi-contact port comprising an RJ45 port;

a first high definition multimedia interface (HDMI) port having a second plurality of contacts, individual ones of a subset of the second plurality of contacts of the first HDMI port being directly electrically coupled to individual ones of the first plurality of contacts of the multi-position multi-contact port;

signal processing circuitry configured to receive a converged media signal over at least one of the multi-position multi-contact port or the first high definition multimedia interface (HDMI) port and to convert the converged media signal to a media signal based on a converged signal specification;

a second HDMI port for output of the media signal to at least one sink device;

a fourth contact of nineteen contacts of the HDMI port being coupled to a first contact of eight contacts of the RJ45 port;

a sixth contact of the nineteen contacts of the HDMI port being coupled to a second contact of the eight contacts of the RJ45 port;

a first contact of the nineteen contacts of the HDMI port being coupled to a third contact of the eight contacts of the RJ45 port;

a ninth contact of the nineteen contacts of the HDMI port being coupled to a forth contact of the eight contacts of the RJ45 port;

a seventh contact of the nineteen contacts of the HDMI port being coupled to a fifth contact of the eight contacts of the RJ45 port;

a third contact of the nineteen contacts of the HDMI port being coupled to a sixth contact of the eight contacts of the RJ45 port;

a tenth contact of the nineteen contacts of the HDMI port being coupled to a seventh contact of the eight contacts of the RJ45 port; and a twelfth contact of the nineteen contacts of the HDMI port being coupled to an eighth contact of the eight contacts of the RJ45 port.

9. The receive connectivity device according to claim 8, wherein:

the first plurality of contacts comprises a first plurality of differential pair contacts;

the subset of the second plurality of contacts comprises a second plurality of differential pair contacts; and the converged signal specification defines a plurality of differential signal pairs at a physical layer, the plurality of differential signal pairs being coupled to the first plurality of contacts and the subset of the second plurality of contacts.

10. The device according to claim 9, wherein each differential pair of contacts from the first plurality of differential pair contacts is coupled to a respective differential pair of contacts from the second plurality of differential pair contacts.

11. The device according to claim 8, wherein:

the RJ45 port comprises a T568 telecommunications standard pinout of the eight contacts; and the second HDMI port comprises an HDMI standard pinout of the nineteen contacts.

12. The device according to claim 8, wherein the converged signal specification comprises the HDBaseT specification.

13. The device according to claim 8, wherein the media signal comprises at least one of uncompressed high definition video, digital audio, control, or data signals.

14. The device according to claim 1, wherein the signal processing circuitry is configured to convert the converged media signal to uncompressed high definition video, digital audio, control, and data signals.

15. A connectivity device, comprising:
a multi-position multi-contact port having a first plurality of contacts, the first plurality of contacts comprising a first plurality of differential pair contact and the multi-position multi-contact port comprising an RJ45 port;
a high definition multimedia interface (HDMI) port having a second plurality of contacts, a subset of the second plurality of contacts comprising a second plurality of differential pair contacts, wherein: individual ones of the subset of the second plurality of contacts of the HDMI port are directly coupled to individual ones of the first plurality of contacts of the multi-position multi-contact port;
a fourth contact of nineteen contacts of the HDMI port being coupled to a first contact of eight contacts of the RJ45 port;
a sixth contact of the nineteen contacts of the HDMI port being coupled to a second contact of the eight contacts of the RJ45 port;
a first contact of the nineteen contacts of the HDMI port being coupled to a third contact of the eight contacts of the RJ45 port;
a ninth contact of the nineteen contacts of the HDMI port being coupled to a forth contact of the eight contacts of the RJ45 port;
a seventh contact of the nineteen contacts of the HDMI port being coupled to a fifth contact of the eight contacts of the RJ45 port;
a third contact of the nineteen contacts of the HDMI port being coupled to a sixth contact of the eight contacts of the RJ45 port;
a tenth contact of the nineteen contacts of the HDMI port being coupled to a seventh contact of the eight contacts of the RJ45 port; and
a twelfth contact of the nineteen contacts of the HDMI port being coupled to an eighth contact of the eight contacts of the RJ45 port.

16. The device according to claim 15, wherein each differential pair of contacts from the first plurality of differential pair contacts is coupled to a respective differential pair of contacts from the second plurality of differential pair contacts.

17. The device according to claim 15, wherein:
the RJ45 port comprises a T568 telecommunications standard pinout of eight contacts; and
the second HDMI port comprises an HDMI standard pinout of nineteen contacts.

18. The transmit connectivity device according to claim 1, wherein the fourth contact of the nineteen contacts of the HDMI port corresponds to at least one of pin 1, pin 4, pin 7, or pin 10 of an HDMI standard pinout, and the sixth contact of the nineteen contacts of the HDMI port corresponds to at least one of pin 3, pin 6, pin 9, or pin 12 of the HDMI standard pinout.

19. The transmit connectivity device according to claim 1, wherein:
the first contact of the eight contacts of the RJ45 port corresponds to a first pin of a T568 telecommunications standard pinout of eight contacts;
the second contact of the eight contacts of the RJ45 port corresponds to a second pin of the T568 telecommunications standard pinout of eight contacts;
the third contact of the eight contacts of the RJ45 port corresponds to a third pin of the T568 telecommunications standard pinout of eight contacts;
the fourth contact of the eight contacts of the RJ45 port corresponds to a fourth pin of the T568 telecommunications standard pinout of eight contacts;
the fifth contact of the eight contacts of the RJ45 port corresponds to a fifth pin of the T568 telecommunications standard pinout of eight contacts;
the sixth contact of the eight contacts of the RJ45 port corresponds to a sixth pin of the T568 telecommunications standard pinout of eight contacts;
the seventh contact of the eight contacts of the RJ45 port corresponds to a seventh pin of the T568 telecommunications standard pinout of eight contacts; and
the eighth contact of the eight contacts of the RJ45 port corresponds to an eighth pin of the T568 telecommunications standard pinout of eight contacts.

20. The device according to claim 15, wherein the first contact of the nineteen contacts of the HDMI port corresponds to at least one of pin 1, pin 4, pin 7, or pin 10 of an HDMI standard pinout, and the ninth contact of the nineteen contacts of the HDMI port corresponds to at least one of pin 3, pin 6, pin 9, or pin 12 of the HDMI standard pinout.

* * * * *